(12) United States Patent
Nespola et al.

(10) Patent No.: US 6,700,691 B2
(45) Date of Patent: Mar. 2, 2004

(54) ELECTRO-OPTIC MODULATOR HAVING HIGH BANDWIDTH AND LOW DRIVE VOLTAGE

(75) Inventors: Antonino Nespola, Moncalieri (IT); Simone M. Pensa, Albano Vercellese (IT)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 10/141,226

(22) Filed: May 7, 2002

(65) Prior Publication Data

US 2002/0167711 A1 Nov. 14, 2002

Related U.S. Application Data

(60) Provisional application No. 60/291,633, filed on May 18, 2001.

(30) Foreign Application Priority Data

May 14, 2001 (EP) .............................. 01111643

(51) Int. Cl.[7] .............................. G02F 1/03; G02F 1/07
(52) U.S. Cl. ..................... 359/254; 359/237; 359/245
(58) Field of Search ................. 359/237, 245, 359/246, 254; 385/2, 8, 9, 40

(56) References Cited

U.S. PATENT DOCUMENTS

| | | | | |
|---|---|---|---|---|
| 5,138,480 | A | * | 8/1992 | Dolfi et al. ................. 359/251 |
| 5,748,358 | A | * | 5/1998 | Sugamata et al. .......... 359/245 |
| 6,069,729 | A | * | 5/2000 | Gill et al. ................... 359/245 |
| 6,483,953 | B1 | * | 11/2002 | McBrien et al. ............. 385/2 |
| 6,501,867 | B2 | * | 12/2002 | Gates et al. ................. 385/2 |
| 2002/0109895 | A1 | * | 8/2002 | Gopalakrishnan ........... 359/237 |

FOREIGN PATENT DOCUMENTS

| | | |
|---|---|---|
| EP | 0813092 A1 | 12/1997 |
| EP | 1197784 A1 | 4/2002 |
| WO | WO 01/01190 A1 | 1/2001 |

OTHER PUBLICATIONS

"Lithium Niobate Ridge Waveguide Modulator," I.P. Kaminow, et al, Applied Physics Letters, Vo. 24, No. 12, Jun. 15, 1974.

"Review of Lithium Niobate Modulators For Fiber–Optic Communications Systems," Wooten, et al, Journal of Selected Topics in Quantum Electronics, vol. 6, No. 1 Jan./Feb. 2000.

"40 GHz, Low Half–Wave Voltage Ti : $LiNbO_3$ Intensity Modulator," G.K. Gopalakrishnan, et al Electronics Letters, vol. 28, No. 9, Apr. 23, 1992.

"Finite–Element Modeling of Broad–Band Traveling–Wave Optical Modulators," M. Koshiba, et al, IEEE Transactions on Microwave Theory and Techniques, vol. 47, No. 9 9/99.

"Wide–Band, Low Driving Voltage Ti : $LiNbO_3$ Optical Modulators for 40 Gb/s Applications," R. Madabhushi, et al ECOC '98 Sep. 20–24, 1998, Madrid Spain.

* cited by examiner

*Primary Examiner*—Ricky Mack
*Assistant Examiner*—Brandi N Thomas
(74) *Attorney, Agent, or Firm*—Wilson Sonsini Goodrich & Rosati; Kenta Suzue

(57) ABSTRACT

A high-speed external optical modulator formed on a lithium niobate substrate has a diffused optical waveguide, a surface buffer layer, and electrodes for applying modulating RF energy. The electrodes are electroplated in at least two steps, resulting in a top co-planar waveguide structure lying on a second one. Low driving voltage is achieved through selection of the width, position, and dimension of the lower hot and ground electrodes. The upper ground electrodes and, preferably, also the upper hot electrode, are narrower in width than the corresponding lower electrodes, which helps to provide good velocity matching, good impedance values, and low electrical losses.

20 Claims, 11 Drawing Sheets

ELECTRO-OPTIC MODULATOR HAVING HIGH BANDWIDTH AND LOW DRIVE VOLTAGE

CLAIM OF PRIORITY

This application claims the priority benefit of European Application No. 01111643.1 filed May 14, 2001 and U.S. Provisional Application No. 60/291,633 filed May 18, 2001.

BACKGROUND OF THE INVENTION

The present invention relates generally to devices for modulating optical signals in a telecommunications system. More particularly, the invention concerns electro-optic modulators that are made of lithium niobate ($LiNbO_3$) and that have an increased bandwidth and lower drive voltage than conventional modulators.

Modern telecommunications have increasingly adopted fiber optics as the medium for transmitting signals. As with electrical telecommunication signals, optical telecommunication signals can carry larger amounts of information when subjected to intensity modulation. Because much of existing electronics technology uses electrical signals, it is desirable to encode information from an electrical signal onto an optical carrier signal used in a telecommunication system.

Two approaches are commonly used to perform such electro-optic modulation: direct modulation and external modulation. Direct modulation involves varying the optical signal by directly modulating the laser diode that originates the optical signal. External modulation involves varying the optical signal after it has left the laser diode through the use of an electro-optic modulator. Unlike direct modulation, external modulation can be provided with negligible chirp, which refers to a change in carrier frequency over time.

Electro-optic external modulators work by causing the index of refraction of an optical waveguide to change in response to an applied electromagnetic signal. As the optical waveguide undergoes a variation in time of its refractive index, the optical signal passing through it is phase modulated with the corresponding electromagnetic signal. For an external modulator to achieve such a performance, the optical waveguide is formed in a material that has a strong electro-optic effect, i.e., where its optical index of refraction is easily affected by an electromagnetic signal. Typically, that material is a crystal substrate such as lithium niobate ($LiNbO_3$). The optical waveguide is formed in the lithium niobate substrate by photolithography and diffusion of titanium. The path of titanium will have a higher index of refraction than the surrounding substrate and will constrain an optical signal within the path.

The electromagnetic signal is imparted on the external modulator through electrodes formed on the surface of the lithium niobate substrate. The electrodes are usually made of gold or a similarly conductive material and are positioned in parallel to the optical path. A portion of the electromagnetic signal travels from a "hot" electrode to one or more ground electrodes by passing through the optical path within the lithium niobate substrate, which causes modulation of the optical signal within the path.

The positioning of electrodes with respect to optical path(s) within the modulator differs depending on whether the lithium niobate is an x-cut or a z-cut crystal. The z-axis of the lithium niobate crystal has the highest electro-optic coefficient. Consequently, the electrodes and the optical path(s) are positioned in the modulator such that the electromagnetic field passes through the optical path along the z-axis. Generally, in an x-cut substrate, the optical path(s) are positioned between the hot and ground electrodes. In a z-cut substrate, the optical path(s) are positioned directly under the electrodes.

FIGS. 1A and 1B illustrate a cross-sectional view and a top view, respectively, of a conventional external modulator in the form of a Mach-Zehnder interferometer made from a substrate of x-cut lithium niobate. As shown in FIG. 1A, lithium-niobate substrate 102 forms the base of the modulator 100 and includes two optical paths 104a and 104b. An RF signal applied between hot conductor 106 and ground electrodes 108a and 108b will cause some of the electromagnetic field to pass through optical paths 104a and 104b, modulating the optical signals passing through those paths. Optical paths 104a and 104b are positioned in this x-cut modulator so that the electromagnetic field passes through them horizontally, i.e., along the z-axis.

FIG. 1B shows the Mach-Zehnder format of the external modulator 100. The incoming optical signal travels along optical path 122 beginning at one end of the modulator and then splits at junction 124 between paths 104a and 104b. Along paths 104a and 104b, the optical signal is phase modulated as it is subjected to the RF electromagnetic field passing between electrodes 106 and 108a and 106 and 108b. At junction 126, the optical signals traveling on paths 104a and 104b are combined, and they exit modulator 100 via path 128. X-cut modulators of this type have proven effective for digital modulation at 10 Gbits/sec.

FIGS. 2A and 2B illustrate a cross-sectional view and a top view, respectively, of a conventional external modulator in the form of a Mach-Zehnder interferometer made from a substrate of z-cut lithium niobate. The same elements and references from FIG. 1A apply to FIG. 2A. As shown in FIG. 2A, optical paths 104a and 104b are positioned directly beneath hot electrode 106 and ground electrode 108b. The optical paths are located in this z-cut modulator so that the electromagnetic field passes through them along substantially vertical lines, i.e., in parallel to the z-axis. FIG. 2B shows a similar arrangement for the Mach-Zehnder interferometer as in FIG. 1B except that the optical paths 104a and 104b are positioned under hot electrode 106 and ground electrode 108b.

The z-cut crystal results in a more concentrated flux of the RF field passing through the optical paths than in an x-cut crystal. However, the improved performance of the z-cut device are mitigated by intrinsic pyroelectric problems and by a chirp parameter of approximately –0.7, which is due to the difference in overlap between the two z-cut optical waveguides. See Wooten et al., "A Review of Lithium Niobate Modulators for Fiber-Optic Communications Systems," *IEEE Journal of Selected Topics in Quantum Electronics*, vol. 6, no. 1, pp. 69–82 (January/February 2000).

Several performance criteria determine the quality of an external optical modulator. For example, an effective modulator must have a broad modulation bandwidth. The standard layout of an optical modulator, however, limits the modulation bandwidth because the electromagnetic signal travels more slowly through the electrodes than the optical signal travels through the optical path. This velocity mismatch introduces a phase error that is a function of the frequency of the electromagnetic signal and the length L of the interaction between the electromagnetic signal and the optical signal within the modulator. A common figure of merit for an optical modulator is the product of its $-3$ $dB_e$ modulation bandwidth, which is denoted $f_{3dB}$, and its interaction length L. This figure of merit should be as high as possible.

To improve velocity matching between the RF signal and the optical signal in the modulator, conventional devices include a buffer layer 120 on the surface of the lithium niobate substrate. Generally comprising $SiO_2$ or BenzoCycloButene (BCB), buffer layer 120 lowers the dielectric constant of the material through which the RF electromagnetic field must pass, thereby increasing the velocity of the field.

Another performance concern for optical modulators is the voltage level required for the electromagnetic signal. The switching voltage necessary for a given amount of modulation should be as low as possible. The necessary voltage level is dictated in large measure by the gap G between the hot and ground electrodes and the electrode length, a small gap G decreasing the required switching voltage. A quality of modulation efficiency is expressed through the half-wave voltage $V_\pi$. For a typical Mach-Zehnder interferometer made from lithium niobate, the half-wave voltage is given by the following:

$$V_\pi = \frac{\lambda G}{n_0^3 r_{33} \Gamma L} \quad (1)$$

where $\lambda$ is the free-space optical wavelength, no is the effective refractive index of the optical signal ($n_0 \cong 2.14$), $r_{33}$ is the electro-optic coefficient, L is the electro-optic interaction length, and $\Gamma$ is the overlap integral indicative of the degree of overlap between the electric and optical fields. See I. P. Kaminov, et al., *Optical Fiber Telecommunications IIIB3*, p. 396 (1997). Another common figure of merit for such an optical modulator is the product of the half-wave voltage $V_\pi$ and the interaction length L, which should be as low as possible.

A third performance criteria for optical modulators is the impedance matching between the output of the source of the modulation signal and the input of the modulator. Without impedance matching, power loss and unwanted electric signal reflections can occur. An RF signal source will typically have an output impedance of 50 ohms. To match that level, the optical modulator should be designed to increase its input impedance to a comparable value. Although ideally the input impedance should also be 50 ohms, an input impedance for the modulator of higher than 30 ohms should suffice to reduce electrical reflections below about −10 dB.

Increasing the input impedance of an optical modulator requires a balance between the size of the electrodes and the gap G with other performance issues. For example, widening the gap G creates a higher impedance but, as discussed above, causes the modulator to require a higher switching voltage.

Patents and publications have proposed various modifications to the standard optical modulator in an attempt to increase modulation bandwidth, decrease switching voltage, and provide impedance matching, i.e., to increase the figure of merit $f_{3dB} \cdot L$ and to decrease the figure of merit $V_\pi \cdot L$. U.S. Pat. No. 5,138,480, for example, discloses increasing the thickness $\tau$ of buffer layer 120, increasing the height t of the electrodes, and reducing the width $W_h$ of the hot electrode and $W_g$ of the ground electrodes such that the ratio of $W_g$ to $W_h$ is less than or about equal to 3.

U.S. Pat. No. 5,748,358 discloses an optical modulator that adds an electric field adjusting region between the buffer layer and the electrodes. FIG. 3, which corresponds substantially to FIG. 11 of the '358 patent, shows a cross-section of such an x-cut modulator 300. According to the '358 patent, electric field adjusting region 310 helps to increase the interaction between the electric field and the optical signal traveling through modulator 300 so that the driving voltage can be lowered.

Applicants have found, however, that the structure proposed in the '358 patent suffers from manufacturing deficiencies. In particular, the '358 patent discloses that to have electrical-optical velocity matching, the width $W_h$ of hot electrode 106 should be smaller than the width $W_f$ of the optical path. According to the '358 patent, when the hot electrode is designed to have a width $W_h$ of 10–20 μm, the effective refractive index for the electric field becomes unacceptably larger than the refractive index for the optical signal. In the preferred embodiment of the '358 patent, the width $W_h$ is set to 5 μm.

Koshiba, "Finite-Element Modeling of Broad-Band Traveling-Wave Optical Modulators," *IEEE Transactions on Microwave Theory and Techniques*, vol. 47, no. 9, pp. 1627–33 (September 1999) describes a full-wave finite element modeling method with hybrid edge/nodal elements. When this finite element modeling is applied to the modulator of the '358 patent, it can be proved that for the modulator to have a width $W_h$ of 5 μm and for electrical-optical velocity matching to occur, thickness t of the electrodes must be at least 25 μm. The electrodes are commonly formed by an electroplating method. Therefore, to achieve a metal thickness of 25 μm, a photoresist thicker than 25 μm would first need to be applied on the substrate surface, and then portions of it corresponding to the electrodes would need to be selectively exposed and removed. Due to the great difference between the width of the hot electrode $W_h$ and the thickness t, the light exposure undercuts the photoresist and results in an opening with a trapezoidal shape, as shown in FIG. 4. As a result, manufacture of the modulator proposed in the '358 patent results in poor reproducibility (the growth angle being variable, for example between about 4 and 5 degrees) of the electroplated electrode. Therefore, the impedance and the effective refractive index for the electromagnetic signal will vary uncontrollably from chip to chip. Moreover, the large thickness of the metal drastically reduces the characteristic impedance of the modulator.

To date, broadband modulators that have low driving voltages have been experimentally achieved without increasing the buffer layer or electrode thickness, but they require formation of recesses within the lithium niobate substrate. For example, Kaminow et al., "Lithium Niobate Ridge Waveguide Modulator," Applied Physics Letters, vol. 24, no. 12, pp. 622–24 (Jun. 15, 1974) generally describes a device that uses a narrow ridge etched into the lithium niobate. Unfortunately, the manufacturing process for these devices becomes very complicated, and the formation of recesses may damage the substrate.

Similarly, Madabhushi et al., "Wide-Band, Low Driving Voltage Ti:$LiNbO_3$ Optical Modulators for 40 Gb/s Applications," ECOC '98, pp. 547–48 (Sep. 20–24, 1998) describes an optical modulator with a so-called step-buffer layer structure. In this article, the authors propose a modulator structure that has an $SiO_2$ buffer layer that is partially etched so that it has one thickness over one half of the waveguide and another thickness over the other half. See also G. K. Gopalakrishnan, et al., "40 GHz, Low Half-Wave Voltage Ti:$LiNbO_3$ Intensity Modulator," *Electronics Letters*, Vol. 28, pp. 826–27 (April 1992).

Other proposals to modify conventional modulator structures to improve optical-electrical velocity matching, driving voltage, and impedance matching have faced conflicting outcomes. For example, an increase of the buffer layer thickness τ has the positive effects of lowering the refractive index for the electromagnetic field (which is typically higher than the refractive index for the optical signal) and increasing the impedance as well as the bandwidth, but it also results in an increase of the half-wave voltage. If the electrode thickness t is increased, optical-to-electrical velocity mismatch is desirably reduced, but characteristic impedance is undesirably reduced as well. Similarly, an increase of the electrode gap G decreases the electric field strength, which increases the product $V_\pi \cdot L$, increases the impedance, and decreases electromagnetic attenuation. An increased gap G, however, diminishes the positive effect of the thick buffer layer, increasing the refractive index for the electromagnetic field.

Applicants have observed that conventional optical modulators do not provide adequate adjustment of the refractive index or dielectric constant for the electromagnetic signal and increase in the characteristic impedance while also permitting easy and consistent manufacturability. Applicants have further observed that the existing proposals for single-layer ground electrodes in an optical modulator do not provide sufficiently high bandwidth and low drive voltage for future applications.

SUMMARY OF THE INVENTION

Applicants have found that the drawbacks of conventional optical modulators can be overcome with an optical modulator that incorporates more than one layer for the hot electrode and the ground electrodes. Applicants has in particular discovered that an optical modulator having an upper layer for ground electrodes that is narrower in width than a lower layer can provide desirable electrical-optical velocity matching and desirable electrical impedance matching.

In a first aspect, an optical modulator consistent with the principles of the present invention that imparts intensity modulation on an optical carrier signal in response to an electromagnetic drive signal includes a substrate of a material having an electro-optic effect, an optical path formed within the substrate, and preferably a buffer layer formed on top of the substrate. The buffer layer is a material having a dielectric constant lower than the substrate.

On top of the substrate or of the buffer layer, the optical modulator further includes a hot electrode and at least one ground electrode, where both electrodes extend substantially parallel to at least a portion of the optical path. The hot electrode includes a lower hot electrode positioned above the buffer layer and an upper hot electrode positioned on top of the lower electrode, where the upper hot electrode is preferably smaller in width than the lower hot electrode. The ground electrode includes a lower ground electrode positioned above the buffer layer and separated from the lower hot electrode by a gap $G_1$, and an upper ground electrode positioned on top of the lower ground electrode and separated from the upper hot electrode by a gap $G_2$ larger than $G_1$. The upper ground electrode is smaller in width than the lower ground electrode.

In a second aspect, a Mach-Zehnder interferometer consistent with the principles of the present invention can be formed on a substrate of lithium niobate and includes an optical path of diffused titanium within the substrate, a hot electrode, and a ground electrode. The hot electrode is positioned on top of the substrate and is made of a first layer overlapped by a second layer, where the first layer is larger in width and smaller in height than the second layer. The ground electrode is also positioned on top of the substrate and is made of a first layer overlapped by a second layer, where the first layer being larger in width and smaller in height than the second layer. Both the hot electrode and the ground electrode extend substantially parallel to each other and to the optical path along an interaction length.

In a thirds aspect, a method of making a Mach-Zehnder interferometer and, in particular, an optical modulator, consistent with the principles of the present invention, includes diffusing titanium into a substrate of lithium niobate in a confined region to form an optical path through the substrate, preferably depositing a buffer layer on a top surface of the substrate of a material having a dielectric constant lower than a dielectric constant of the substrate, electroplating a first pattern of electrically conductive material on the surface, and electroplating a second pattern of electrically conductive material on top of the first pattern. The first pattern includes a hot electrode and at least one ground electrode. The second pattern is narrower than the first pattern over the hot electrode and the at least one ground electrode, respectively. Both electrodes are parallel to the optical path along an interaction length.

It is to be understood that both the foregoing general description and the following detailed description are exemplary and explanatory only and are intended to provide further explanation of the invention as claimed. The following description, as well as the practice of the invention, set forth and suggest additional advantages and purposes of the invention.

BRIEF DESCRIPTION OF THE DRAWINGS

The accompanying drawings, which are incorporated in and constitute a part of this specification, illustrate embodiments of the invention and, together with the description, serve to explain the advantages and principles of the invention.

DETAILED DESCRIPTION OF THE PREFERRED EMBODIMENTS

Figure 1A:
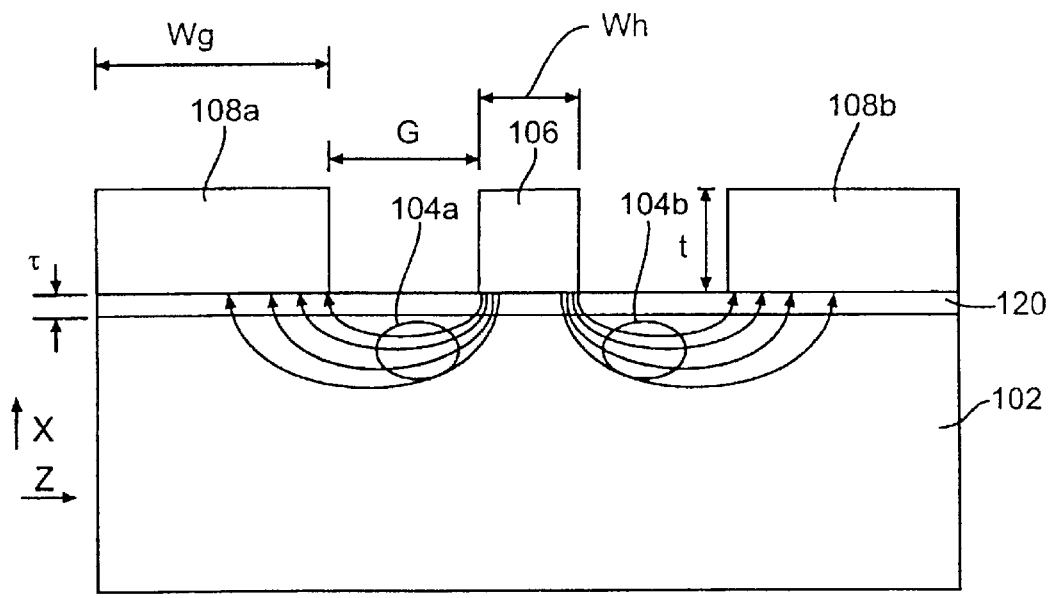
FIG. 1A is a cross-sectional view of a conventional electro-optic modulator formed on an x-cut lithium niobate substrate.
Figure 1B:
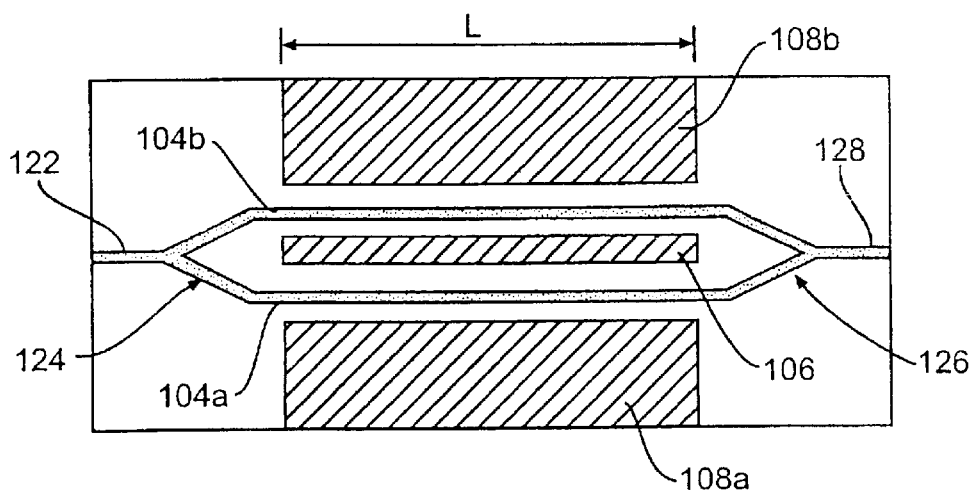
FIG. 1B is a plan view of the conventional electro-optic modulator of FIG. 1A.
Figure 2A:
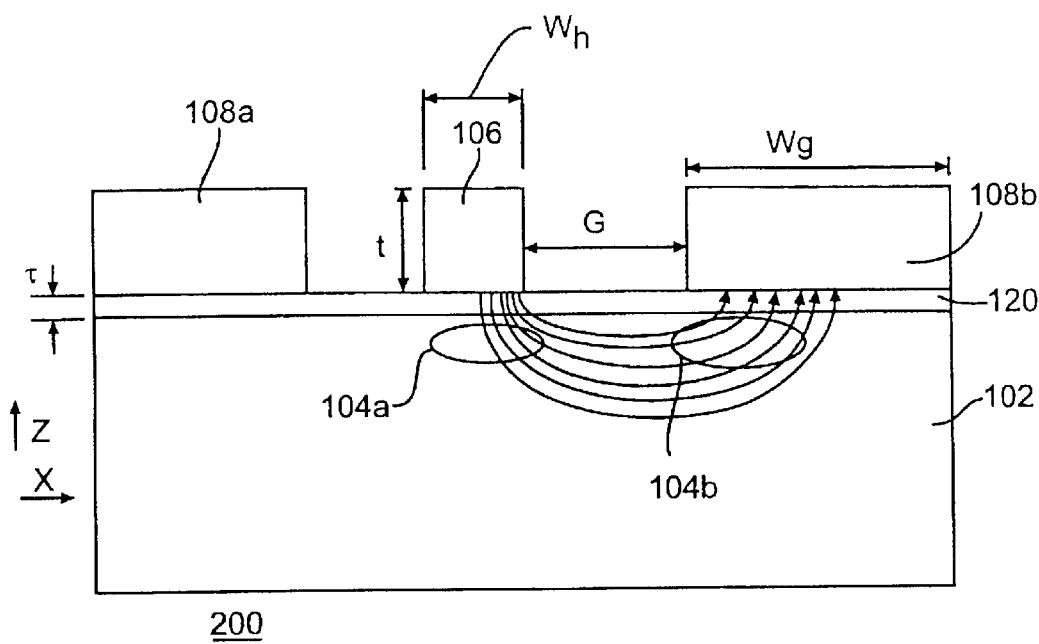
FIG. 2A is a cross-sectional view of a conventional electro-optic modulator formed on a z-cut lithium niobate substrate.
Figure 2B:
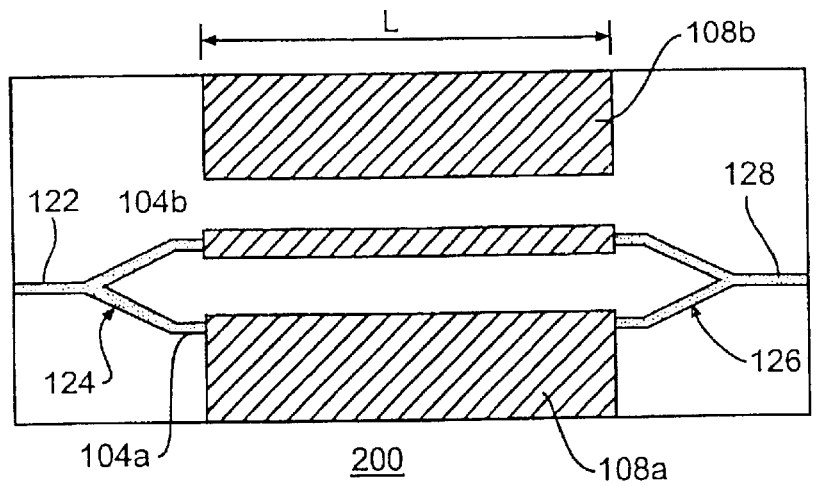
FIG. 2B is a plan view of the conventional electro-optic modulator of FIG. 2A.
Figure 3:
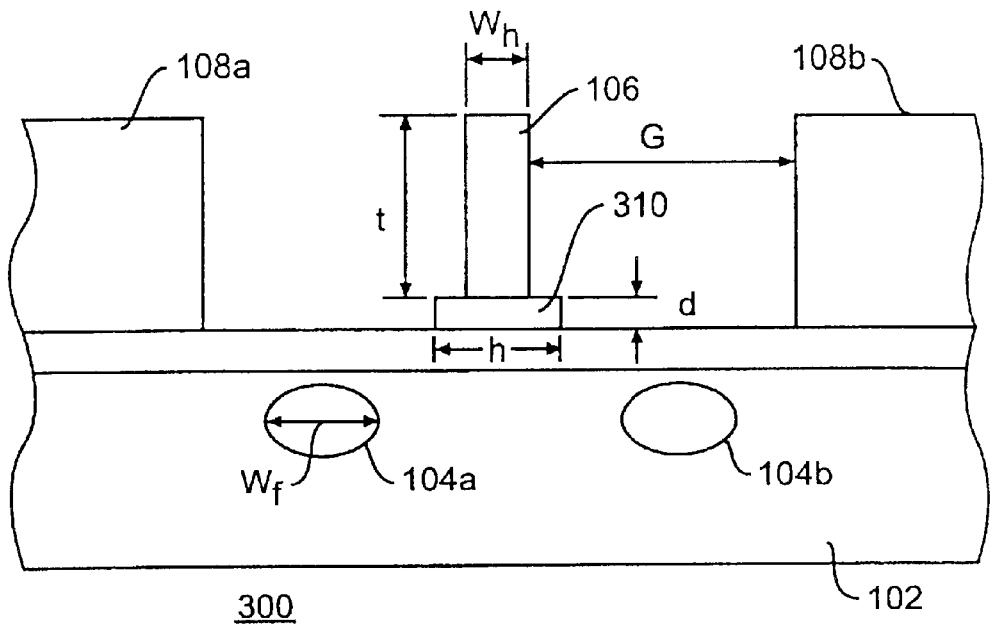
FIG. 3 is a cross-sectional view of an electro-optic modulator as disclosed in U.S. Pat. No. 5,748,358.
Figure 4:
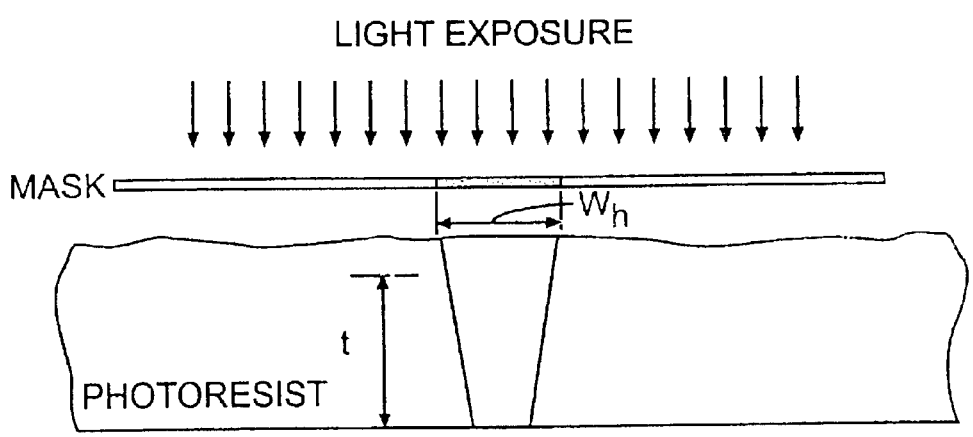
FIG. 4 is a cross-sectional view the electroplating process for forming electrodes for the electro-optic modulator of FIG. 3.

Reference will now be made to various embodiments according to this invention, examples of which are shown in the accompanying drawings and will be obvious from the description of the invention. In the drawings, the same reference numbers represent the same or similar elements in the different drawings whenever possible.

In accordance with the present invention, an optical modulator for imparting intensity modulation on an optical carrier signal in response to an electromagnetic drive signal includes a substrate of a material having an electro-optic effect, an optical path formed within the substrate, a buffer layer formed on top of the substrate, a hot electrode extending parallel to at least a portion of the optical path, and a ground electrode also extending parallel to the at least a portion of the optical path.

Figure 5A:
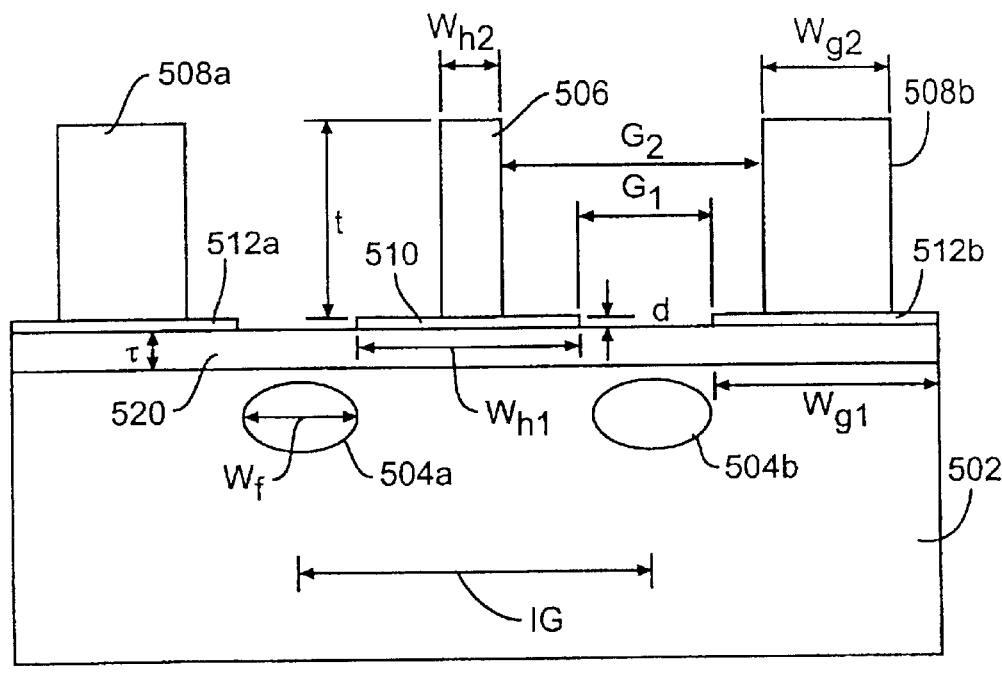
FIG. 5A is a cross-sectional view of a first embodiment of an electro-optic modulator consistent with the principles of the present invention.

Generally referred to as 500 in FIG. 5A, the optical modulator consistent with the present invention has a substrate 502 made of lithium niobate. A less preferred alternative material is lithium tantalate ($LiTaO_3$). Alternative electro-optical materials may also be used. The embodiment depicted in FIG. 5A is an x-cut lithium niobate crystal. Within substrate 502 are optical paths 504a and 504b that are formed by diffusing titanium into the substrate. Titanium provides a higher refractive index compared with lithium niobate and therefore constrains light waves that pass along the titanium paths 504a and 504b. The optical paths 504a and 504b are configured to have a width of $W_f$ and a reciprocal distance (measured between the respective centers) of IG.

On the top surface of substrate 502, a buffer layer 520 of a material having a dielectric constant lower than lithium niobate is deposited. Preferably, buffer layer 520 is $SiO_2$, but BenzoCycloButene (BCB) may be used instead. As shown, buffer layer 520 has a thickness τ and extends across the entire surface of the substrate. As is readily known to one of ordinary skill in the art, buffer layer 520 helps to lower the effective dielectric constant of the material through which the electric field must pass in modulating the optical signal in the modulator. Consequently, materials other than $SiO_2$ and dimensions other than coverage of the entire substrate for the buffer layer may be employed to achieve the same results. Alternatively, buffer layer 520 may be omitted altogether, with the corresponding loss in performance discussed below.

In accordance with the present invention, the hot electrode and the ground electrode in modulator 500 comprise at least two layers. Although two layers are preferred in the disclosed embodiments, it is envisioned that additional layers could further be employed to achieve the principles of the present invention. In the embodiment of FIG. 5A, layers 506 and 510 define the hot electrode. The embodiment of FIG. 5A contains two ground electrodes on either side of the hot electrode. The electrodes have a same length L. Layers 508a and 512a and layers 508b and 512b define the respective ground electrodes. Alternatively, only one ground electrode may be used. In either instance, the electrodes are preferably made of gold or other similar material that is highly conductive to an electric signal.

For each electrode, the first or lower layer is wider than the second or upper layer. For example, the lower layer 510 for the hot electrode has a width $W_{h1}$ that is greater than the width $W_{h2}$ for its upper layer 506. Likewise, lower layers 512a and 512b have a width of $W_{g1}$ that is greater than the width $W_{g2}$ for their respective upper layers. As an alternative, the first or lower layer of the hot electrode may have the same width of the second or upper layer of the hot electrode.

Moreover, the inner edge of the lower layers (i.e. the edge facing the hot electrode) extends over the inner edge of the respective upper layers or is coplanar with it. Preferably, $W_{g1}$ is greater than 300 microns and $W_{g2}$ is lower than 300 microns. More preferably, $W_{g2}$ is lower than 40 microns. For purposes of the present invention, a lower co-planar waveguide architecture with ground electrodes more than 300 microns wide is referred to as an infinite ground electrode. Therefore, modulator 500 combines infinite lower ground electrodes with finite upper ground electrodes.

Also, for each electrode, the first or lower layer is thinner in height than the second or upper layer. Specifically, lower layer 510 for the hot electrode has a height "d" that is less than the height "t" for its upper layer. Preferably but not restrictively, and as shown in the embodiment of FIG. 5A, lower layer 510 for the hot electrode is substantially the same thickness as lower layers 512a and 512b for the ground electrodes. Likewise, upper layer 506 for the hot electrode is substantially the same thickness as upper layers 508a and 508b for the ground electrodes.

The upper portion of the hot and ground electrodes and the lower portion of the hot and ground electrodes are separated by predetermined distances on the surface of substrate 502. Namely, the edge of lower layer 510 of the hot electrode is separated from the closest edge of lower layer 512b of one of the ground electrodes by a gap $G_1$, as shown in FIG. 5A. The edge of upper layer 506 of the hot electrode is separated from the closest edge of upper layer 508b by a gap $G_2$.

Figure 5B:
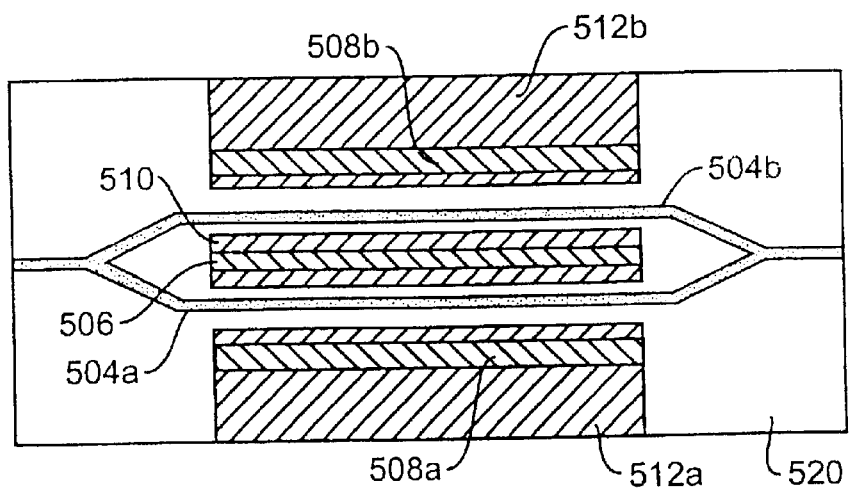
FIG. 5B is a plan view of the electro-optic modulator of FIG. 5A.

FIG. 5B illustrates a plan view of the optical modulator of the present invention of FIG. 5A. According to FIG. 5A, the preferred optical modulator is a Mach-Zehnder configuration in which the optical path is split into two paths 504a and 504b. FIG. 5B shows the respective layout of the electrodes on the surface of substrate 502. An interaction length is established along the center of modulator 500 where optical paths 504a and 504b are arranged in parallel with electrodes 508a, 508b, 512a, 512b, 506, and 510.

As with other optical modulators in the art, modulator 500 of the present invention operates by imparting information carried by an RF electromagnetic signal onto an optical carrier signal using the electro-optic characteristics of lithium niobate. The optical signal is transmitted through an optical path that is split in modulator 500 into paths 504a and/or 504b. The RF signal is introduced between the hot electrode and the ground electrodes. A portion of the RF signal travels from the hot electrode to the ground electrode by passing through buffer layer 520, substrate 502, and optical paths 504a and/or 504b.

Applicants have observed that an optical modulator with good microwave index values (i.e., good dielectric constant or refractive index values for the RF signal passing between the hot and ground electrodes) and characteristic impedances can be achieved by configuring the ground electrodes with upper layers 508a and 508b having a width less than lower layers 512a and 512b or, in particular, by providing infinite lower layers 512a and 512b and finite upper layers 508a and 508b.

The various dimensions of the electrodes in FIG. 5B may be altered to attain the desired performance from modulator 500. Desirable operative parameters for modulator 500 are the following:

$V_\pi \leq 7$ V $30 \, \Omega \leq Z_0 \leq 50 \, \Omega$ $f_{3dB} \geq 10$ GHz Applicants have observed that the half-wave voltage $V_\pi$ is a function of the gap $G_1$ and of the buffer layer thickness $\tau$. By opportunely choosing $G_1$ and $\tau$, a good trade-off between voltage-length product and velocity matching may be obtained. The second gap $G_2$ and the width $W_{g2}$ can be arranged to accommodate lower microwave loss and higher transmission line impedance. The electrode thicknesses t and d can be selected to correct any difference between the microwave index and the optical index, to reduce the microwave attenuation, or to favor higher impedance for the modulator.

Figure 6A:
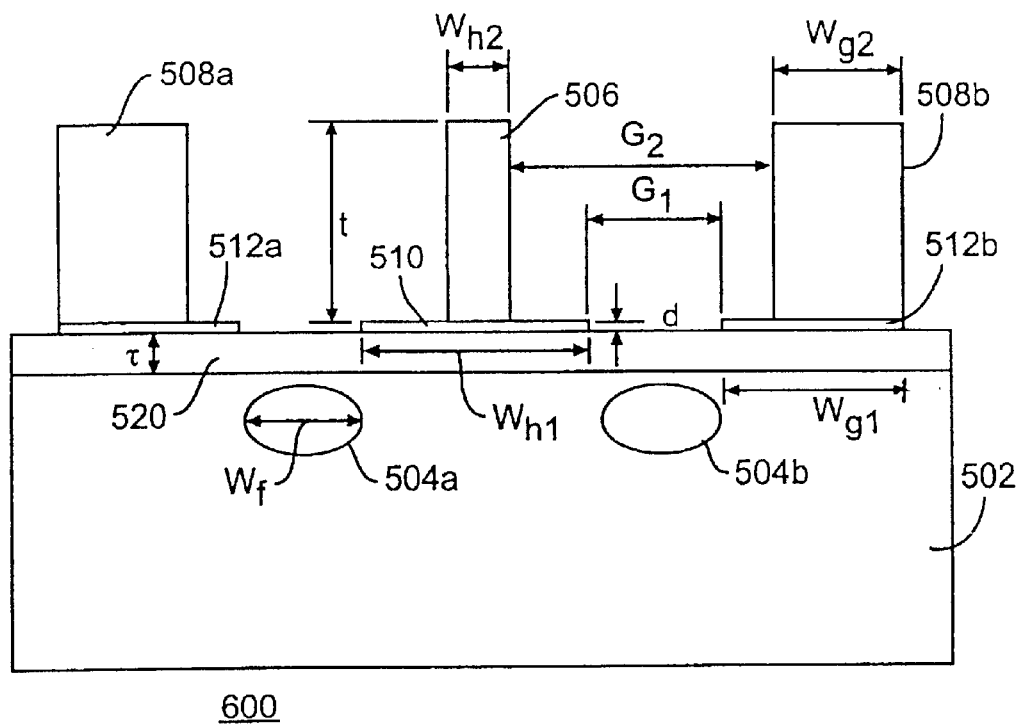
FIG. 6A is a cross-section view of a second embodiment of an electro-optic modulator consistent with the principles of the present invention.

In the above described embodiment of an optical modulator according to the the present invention, preferred dimensional ranges are as follows:

L: 10–40 mm t: 10–20 microns $\tau$: 0.5–1.6 microns d: 0.5–6 microns $G_1$: 5–20 microns $G_2$: 5–25 microns $W_{h1}$: 8–40 microns $W_{h2}$: 7–14 microns IG: 21–28 microns $W_{g1}$: 300–500 microns $W_{g2}$: 8–100 microns, preferably 8–40 microns FIG. 6A illustrates a second embodiment of an optical modulator consistent with the present invention. Optical modulator 600 of FIG. 6A is the same as modulator 500 of FIG. 5A except that lower layers 512a and 512b of the ground electrodes do not extend to the edge of substrate 502. In contrast with modulator 500, modulator 600 has both finite lower and upper ground electrodes.

As shown in FIG. 6A, the outer edge of lower ground electrode 512a (i.e. the edge directed towards the edge of substrate 502) is co-planar with the outer edge of upper ground electrode 508a. The upper and lower electrodes may both be finite, however, without having their edges be co-planar as in FIG. 6A. Moreover, as in the embodiment of FIG. 5, the inner edge of lower ground electrode 512a (i.e. the edge facing the hot electrode) extends over the inner edge of upper ground electrode 508a or is coplanar with it. The same applies to the other ground electrode.

Having a finite ground at the lower ground electrode enables modulator 600 to achieve the high impedance and velocity matching conditions more easily. Consequently, the thickness t of the upper electrode may be reduced further.

Figure 6B:
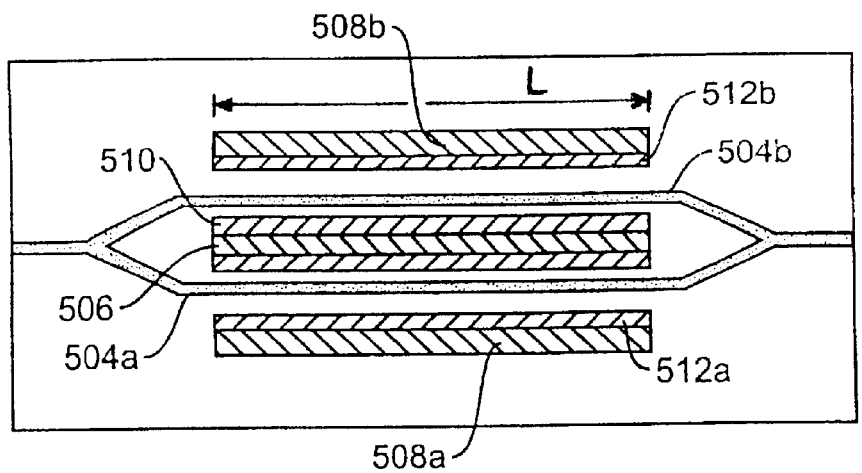
FIG. 6B is a plan view of the electro-optic modulator of FIG. 6A.

FIG. 6B shows a plan view of the second embodiment. As shown in FIG. 6B, the lower ground electrodes 512a and 512b in modulator 600 are substantially smaller in width than in modulator 500 of FIG. 5B and do not extend beyond the edge of upper ground electrodes 508a and 508b. Again, though, such co-planarity is not critical to the performance of the present invention.

Figure 7:
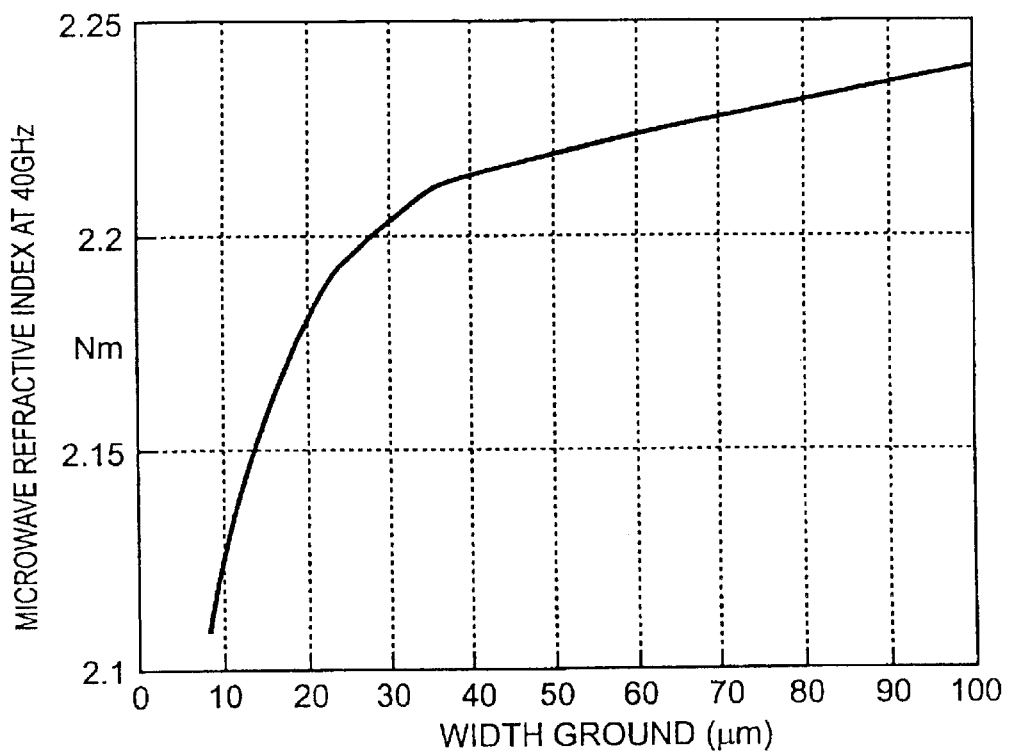
FIG. 7 is a graph showing simulated microwave refractive index v. width of upper ground electrode for an electro-optic modulator consistent with the present invention.
Figure 8:
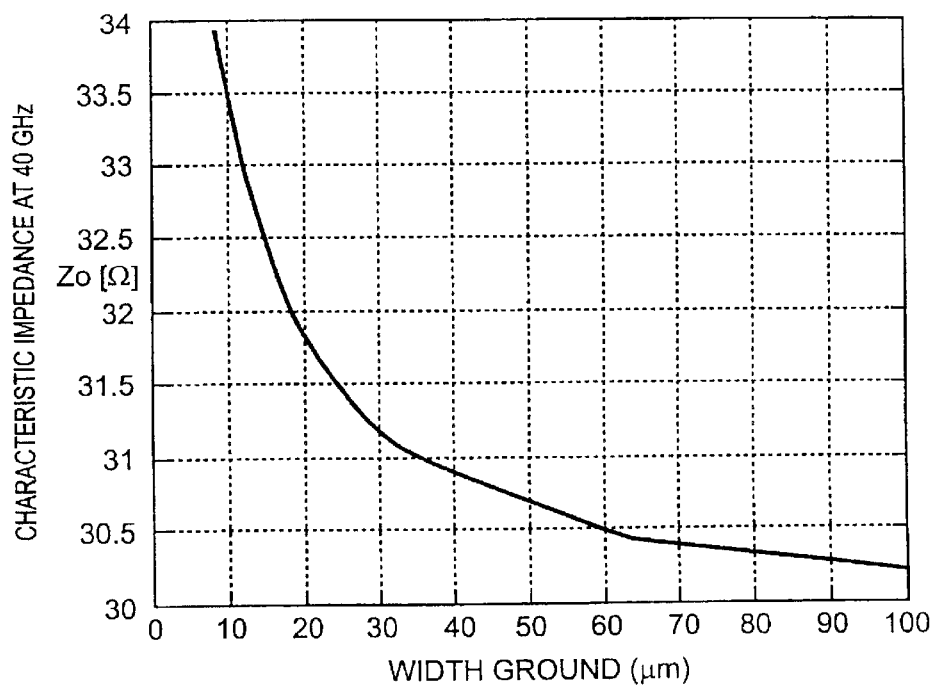
FIG. 8 is a graph showing simulated characteristic impedance v. width of upper ground electrode for an electro-optic modulator consistent with the present invention.

Preferred dimensional ranges for the optical modulator of the embodiment of FIG. 6 are the same as listed for the embodiment of FIG. 5, but with $W_{g1}$: 10–300 microns. In an example said dimensions are as follows:

L: 29 mm t: 19 microns $\tau$: 1.2 microns d: 3 microns $G_1$: 9 microns $G_2$: 16 microns $W_{h1}$: 12 microns $W_{h2}$: 16 microns IG: 25 microns $W_{g1}$: $W_{g2}$+5 microns $W_{g2}$: 8–100 microns Applicants have performed detailed model simulations using a full-wave finite element method with hybrid edge/nodal elements, as described in Koshiba, "Finite-Element Modeling of Broad-Band Traveling-Wave Optical Modulators," *IEEE Transactions on Microwave Theory and Techniques*, vol. 47, no. 9, pp. 1627–33 (September 1999). FIGS. 7 and 8 depict some simulation results for modulator 600 having the dimensions listed above. In particular, the horizontal axes in FIGS. 7 and 8 denote the width $W_{g2}$ of the upper ground electrode. The vertical axis in FIG. 7 denotes the effective refractive index seen by the RF signal. The vertical axis in FIG. 8 represents the microwave impedance at 40 GHz. FIGS. 7 and 8 show that decreasing the width of the upper ground electrode favorably decreases the microwave refractive index and increases the characteristic impedance for the modulator.

Figure 9:
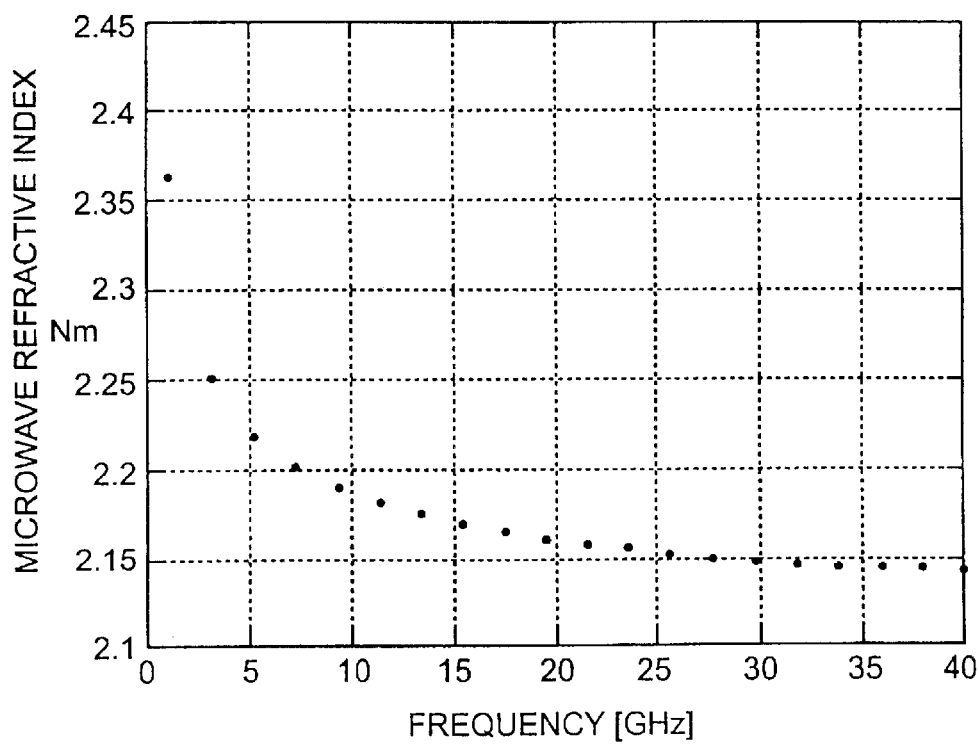
FIG. 9 is a graph showing simulated microwave refractive index v. frequency for an electro-optic modulator consistent with the present invention.
Figure 10:
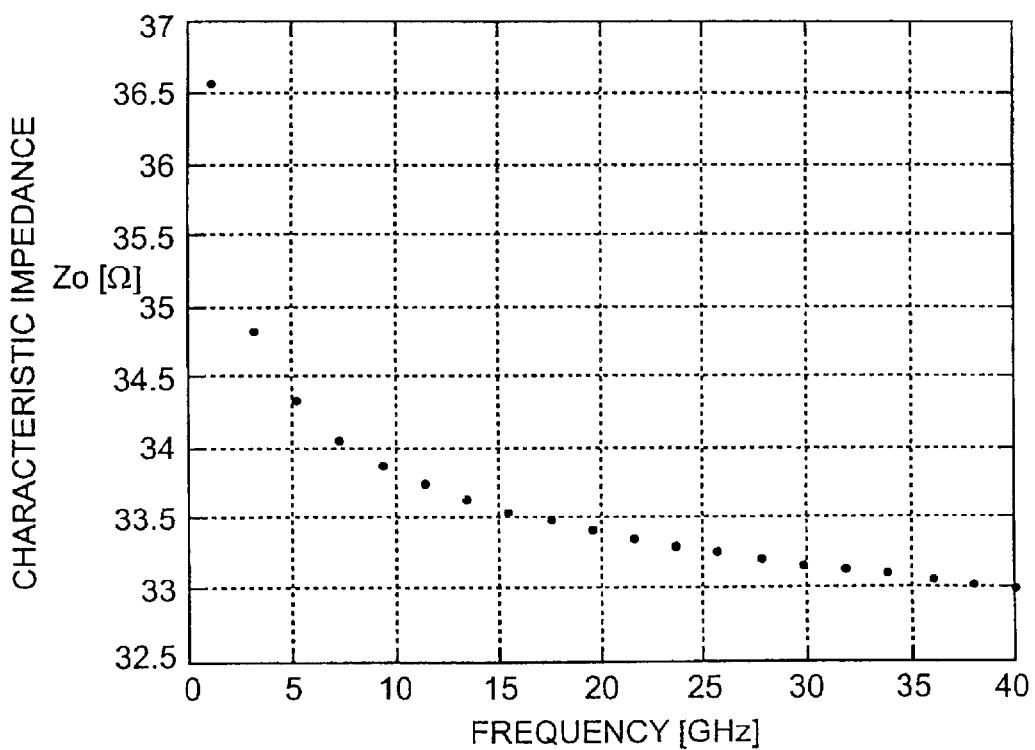
FIG. 10 is a graph showing simulated characteristic impedance v. frequency for an electro-optic modulator consistent with the present invention.

FIGS. 9 and 10 show simulation results when the width $W_{g2}$ of the upper ground electrode is selected to be 12 microns. According to these figures, at a modulation frequency of 40 GHz, modulator 600 can attain a microwave refractive index of 2.14 and a characteristic impedance of about 33 ohms. Moreover, simulation confirms that modulator 600 can achieve a product of half-wave voltage to interaction length of 11.8 V·cm.

Figure 11:
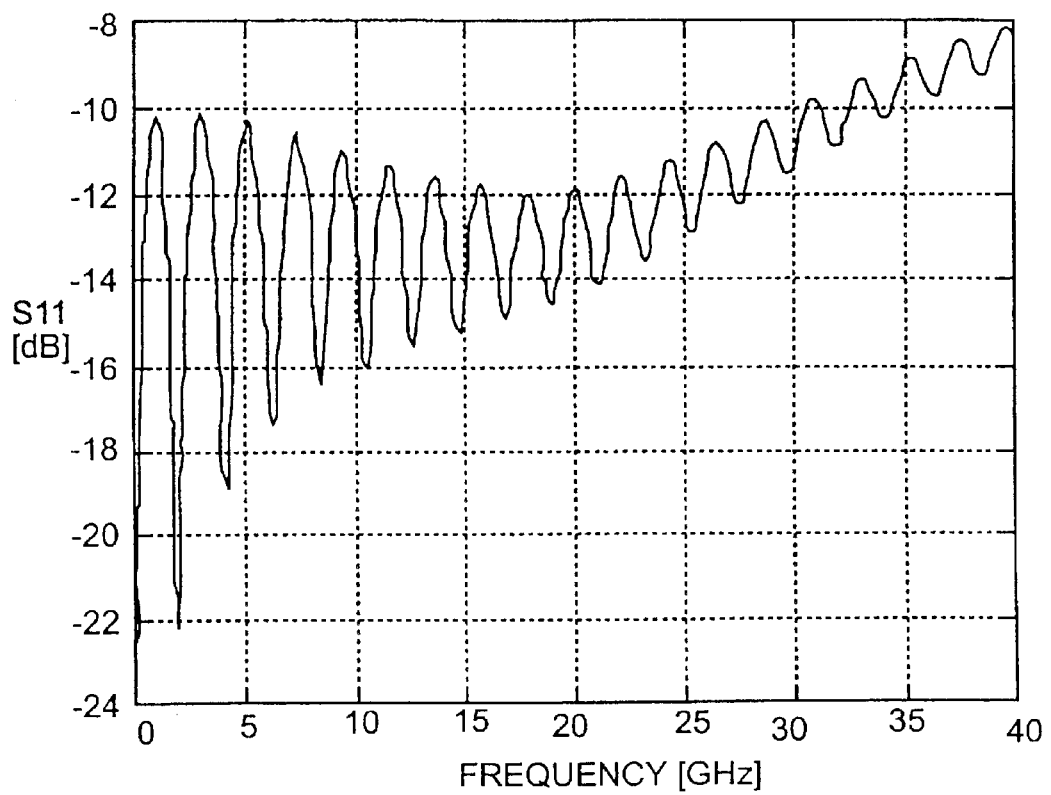
FIG. 11 is a graph showing simulated electrical return loss (S11) v. frequency for an electro-optic modulator consistent with the present invention.

Another simulated modulator parameter to be measured is S11. S11 refers to the electrical return loss and indicates the reflected power returning to the high-speed drive electronics. FIG. 11 shows the return loss as a function of frequency for a packaged device. As shown in FIG. 11, S11 is less than −10 dB from 40 MHz to about 30 GHz.

Figure 12:
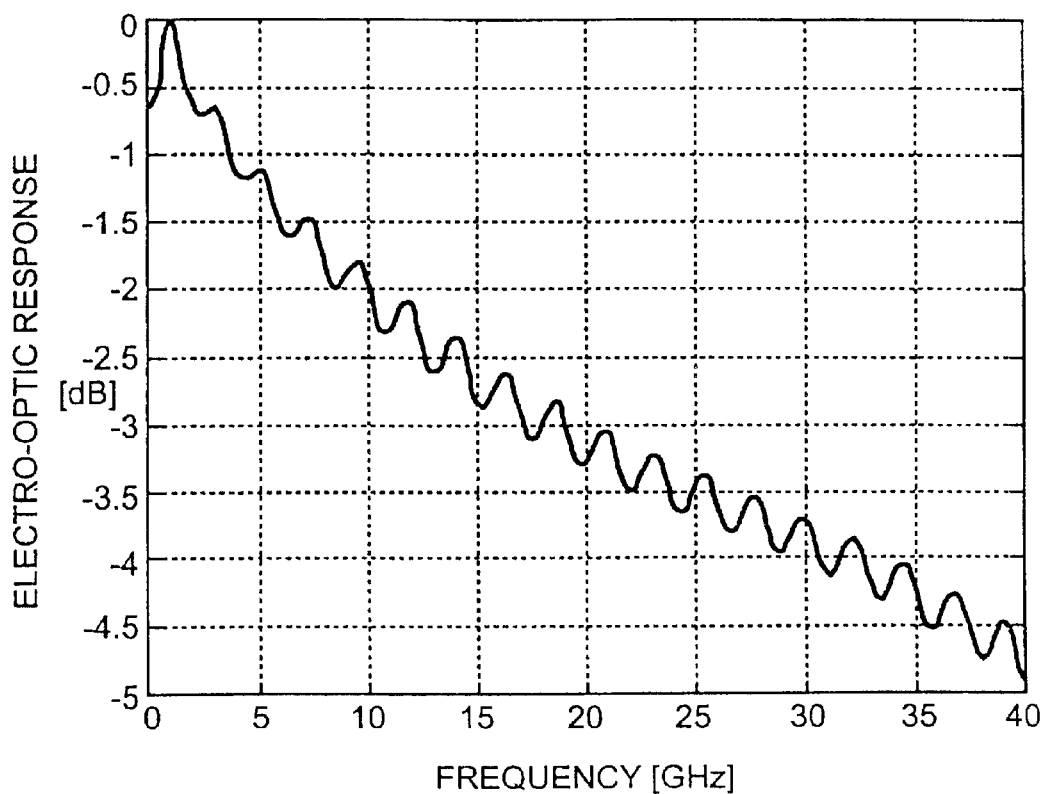
FIG. 12 is a graph showing simulated electro-optic response (S21eo) v. frequency for an electro-optic modulator consistent with the present invention.

S21eo ("eo" stands for "electro-optical") is another simulated modulator parameter. It represents the electro-optic response, i.e. the modulation efficiency, and refers to the ratio between the output optical power and the input electrical power. FIG. 12 shows the electro-optic response as a function of frequency for the arrangement described above for parameter S11. According to that graph, the electro-optic 3 dB bandwidth is about 20 GHz. This result corresponds substantially to the best results currently achieved with z-cut modulators, with the further advantages that an x-cut structure free from pyroelectric and chirp problems can in this case be used and that very low values of $V_\pi$·L are obtainable. Both S11 and S21eo were measured in the manner described in G. K. Gopalakrishnan et al., "Performance and Modeling of Broadband LiNbO$_3$ Traveling Wave Optical Intensity Modulators," *Journal of Lightwave Technology*, Vol. 12, No. 10 (October 1994).

Modulators 500 and 600 have been described as x-cut crystals, but the present invention also could be practiced with a z-cut crystal. Naturally, in a z-cut substrate, the optical paths are situated directly underneath the electrodes. Consequently, the electrodes may be formed in the z-cut alternative to have narrower lower electrode widths $W_{h1}$ and $W_{g1}$.

In either the x-cut or z-cut options, the present invention can be manufactured following substantially the same process. The techniques, equipment, and materials for each of the manufacturing steps is within the knowledge of one of ordinary skill in the art. The method for making either Mach-Zehnder interferometer from a substrate of lithium niobate would begin with the step of diffusing titanium into the substrate in a confined region to form an optical path through the substrate. Next, the buffer layer of $SiO_2$ or similar material would be deposited on top of the substrate. Then, a first pattern of gold or similar material would be electroplated on the buffer layer. The first pattern includes the hot electrode and at least one ground electrode. Electroplating is also a common technique in the field and would encompass several substeps such as the application of a mask and photoresist and exposure to light. In accordance with the present invention, a second electroplating step would follow the first in which a second pattern of gold or other electrically conductive material would be applied on top of the first pattern. This second pattern forms the upper electrodes and would have the configuration where the upper hot electrode is narrower in width than the lower hot electrode and the upper ground electrode is narrower in width than the lower ground electrode. Additional electroplating steps may be performed if more than two layers are used for the electrodes.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical modulator for imparting intensity modulation on an optical carrier signal in response to an electromagnetic drive signal, comprising:
    a substrate of a material having an electro-optic effect;
    an optical path formed within the substrate;
    a hot electrode extending parallel to at least a portion of the optical path; and
    a ground electrode extending parallel to the at least a portion of the optical pat and including:
        a lower pound electrode positioned above the substrate and separated from the hot electrode by a gap $G_1$;
        an upper finite ground electrode positioned on top of the lower ground electrode and separated from the hot electrode by a gap $G_2$ larger than $G_1$, the upper ground electrode being smaller in width than the lower ground electrode.
2. The optical modulator of claim 1, further comprising a buffer layer of a material having a dielectric constant lower than the substrate, formed between the substrate and the electrodes.
3. The optical modulator of claim 1, wherein the upper finite ground electrode has a height greater than the lower ground electrode to provide a proper ratio for reducing microwave attenuation and to correct for any differences between the microwave index and the optical index.
4. The optical modulator of claim 3, wherein the hot electrode comprises:
    a lower hot electrode positioned above the substrate, and
    an upper hot electrode positioned on top of the lower electrode, the upper hot electrode being smaller in width than the lower hot electrode.
5. The optical modulator of claim 4, wherein the upper hot electrode has a height greater than the lower hot electrode.
6. The optical modulator of claim 4, wherein the height of the upper hot electrode and the upper finite ground electrode is between about 10 microns and 20 microns.
7. The optical modulator of claim 4, wherein the height of the lower ground electrode and the lower hot electrode is between about 1.5 microns and 6 microns.
8. The optical modulator of claim 7, wherein the height of the lower ground electrode is selectively increased to reduce microwave attenuation.
9. The optical modulator of claim 8, wherein the width of the lower ground electrode is between about 10 microns and 500 microns.
10. The optical modulator of claim 9, wherein the width of the lower round electrode is less than about 300 microns.
11. The optical modulator of claim 9, wherein the width of the upper finite ground electrode is between about 8 microns and 40 microns.
12. The optical modulator of claim 11, wherein the width of the upper finite ground electrode is selectively decreased for increasing the characteristic impedance of the optical modulator.
13. The optical modulator of claim 1, wherein the gap $G_1$ is between about 5 microns and 20 microns, and the gap $G_2$ is between about 5 microns and 25 microns.
14. The optical modulator of claim 1, wherein the substrate comprises an x-cut $LiNbO_3$ crystal.
15. The optical modulator of claim 1, wherein the substrate comprises a z-cut $LiNbO_3$ crystal.
16. The optical modulator of claim 2, wherein a Mach-Zehnder interferometer is formed within the substrate.
17. The optical modulator of claim 1, wherein an inner edge of the lower ground electrode facing the hot electrode extends over a correspondent edge of the upper ground electrode or is coplanar with the correspondent edge of the upper ground electrode.
18. A Mach-Zehnder interferometer formed on a substrate of lithium niobate, comprising:
    an optical path of diffused titanium within the substrate;
    a hot electrode on top of the substrate; and
    a ground electrode on top of the substrate made of a first layer overlapped by a second layer, the first layer being larger in width than the second layer being a finite electrode,
    wherein the hot electrode and the ground electrode extend substantially parallel to each other and to the optical path along an interaction length.
19. The Mach-Zehnder interferometer of claim 18, wherein the hot electrode is made of a first electroplated layer overlapped by a second electroplated layer, the first electroplated layer of the hot electrode being larger in width than the second electroplated layer of the hot electrode.
20. The Mach-Zehnder interferometer of claim 19, wherein all the layers are electroplated to a height greater than 1.5 microns such that the second layer of the hot electrode and the second layer of the ground electrode have a height greater than the first layers of the hot electrode and the first layer of the ground electrode, respectively.

* * * * *